United States Patent [19]
Ono

[11] Patent Number: 4,552,408
[45] Date of Patent: Nov. 12, 1985

[54] ADJUSTABLE ANCHOR MOUNTING DEVICE
[75] Inventor: Katsuyasu Ono, Kanagawa, Japan
[73] Assignee: NSK-Warner K.K., Japan
[21] Appl. No.: 532,406
[22] Filed: Sep. 15, 1983
[30] Foreign Application Priority Data Sep. 24, 1982 [JP] Japan ............................ 57-144423[U]

[51] Int. Cl.⁴ ...................... A62B 35/02; B60R 21/10
[52] U.S. Cl. ................................... 297/483; 280/808; 297/468
[58] Field of Search ................ 297/468, 483; 280/801, 280/808; 248/429

[56] References Cited
U.S. PATENT DOCUMENTS

| 3,381,927 | 5/1968 | Stamates | 248/429 |
| 3,955,511 | 5/1976 | Bak | 108/137 |
| 4,225,185 | 9/1980 | Krzok | 297/468 |
| 4,291,856 | 9/1981 | Urai | 248/429 |
| 4,470,618 | 9/1984 | Ono | 297/483 X |

FOREIGN PATENT DOCUMENTS

| 2932505 | 2/1981 | Fed. Rep. of Germany . |
| 2947391 | 5/1981 | Fed. Rep. of Germany . |
| 3126868 | 4/1982 | Fed. Rep. of Germany . |
| 343013 | 9/1936 | Italy ................................ 248/429 |
| 1486974 | 9/1977 | United Kingdom . |
| 2070414 | 9/1981 | United Kingdom . |
| 2078092 | 1/1982 | United Kingdom ............... 280/801 |
| 2081568 | 2/1982 | United Kingdom . |

Primary Examiner—William E. Lyddane
Assistant Examiner—Peter R. Brown
Attorney, Agent, or Firm—Cantor and Lessler

[57] ABSTRACT

An adjustable anchor mounting device suitable for use in a vehicle seat belt. The device comprises a base having a plurality of interlocking means provided spacedly along the direction of displacement of an anchor, a slide member guided along the base and carrying the anchor thereon, a latch piece supported on the slide member, biasing means normally urging the latch piece so as to keep it in engagement with one of the interlocking means, and release means adapted to make the latch piece disengaged from the one of the interlocking means so as to permit the adjustment of position of the anchor. The latch piece is preferably supported by at least two points on the slide member with the corresponding interlocking means interposed between the two points. The device permits a prompt, smooth and fail-free adjustment of the position of the anchor, e.g., a deflector. The latch piece can be kept in engagement with the one of the interlocking means even if the vehicle is overturned.

9 Claims, 5 Drawing Figures

ADJUSTABLE ANCHOR MOUNTING DEVICE

TECHNICAL FIELD

This invention relates to an adjustable anchor mounting device suitable for use in a vehicle seat belt. The term "anchor" as used herein means not only an upper fitting such as a slip guide or deflector of a vehicle seat belt making use of a lap-shoulder continuous webbing or an upper fitting adapted to fixedly secure the upper end of a lap-shoulder continuous webbing or a shoulder webbing but also a lower fitting such as an inner lower fitting for holding a buckle or an outer lower fitting adapted to secure the lower end of a lap-shoulder continuous webbing or a lap webbing. The present invention will however be described herein by taking an upper fitting, particularly a deflector as a representative example of such an anchor.

BACKGROUND ART

The physical constitutions of vehicle occupants who wear seat belts are different to a considerable extent from one occupant to another. Accordingly, it is preferred from the viewpoint of safety that the length of each webbing and the mounting positions of its anchors (especially, the upper fitting for a shoulder webbing) are adjustable in accordance with the physical constitution of the occupant who wears the webbing. The webbing extends over the face or neck area of the occupant if the position of the upper fitting for the shoulder webbing is too high. On the other hand, the webbing passes over his arm instead of extending over his shoulder if the position of the upper fitting for the shoulder webbing is too low. Each of the above cases involves a potential danger that the webbing may not be able to protect the occupant effectively in the event of an emergency.

With the foregoing problem in view, a variety of adjustable upper-fitting mounting devices has been provided (see, for example, U.S. Pat. No. 4,225,185 issued Sept. 30, 1980 to Peter Krzok; U.K. Patent Specification No. 1,486,974 published Sept. 28, 1977 and naming Chrysler United Kingdom Limited as the applicant; U.K. Patent Application No. 2,081,568A laid open on Feb. 24, 1982 and naming Bayerische Motoren Werke AG as the applicant; U.K. Patent Application No. 2,078,092A laid open on Jan. 6, 1980 and naming P A Rentrop Hubbert & Wagner, Fahrzeugausstauttungen GmbH & Co. KG., etc.). Many of such prior art upper-fitting mounting devices include lock members provided integrally with the upper fittings. The upper fittings are displaced by pushing or pulling same so as to cause the lock members to fit in most suitable attachment holes. Mounting devices of the above sort are however accompanied by such drawbacks that they suffer from poor operability because they do not permit smooth height adjustment by one-touch action; and the lock members may be disengaged from their corresponding attachment holes because the lock members may be twisted together with the upper fitting if twisting forces are applied to the upper fittings in the events of emergencies such as vehicle collisions, overturns, etc. Some of conventional upper-fitting mounting devices of another type do not seem to be easy to handle for occupants sitting in the vehicles.

DISCLOSURE OF THE INVENTION

With the foregoing in view, the present invention has as its object the provision of an adjustable anchor mounting device which is easy to handle and is capable of holding its mounted position without failure in the case of an emergency (especially, even if the vehicle is overturned).

In one aspect of this invention, there is thus provided an adjustable anchor mounting device comprising a base fixedly mounted on a vehicle body and having a plurality of interlocking means provided spacedly along the direction of displacement of an anchor, a slide member guided along the base and carrying the anchor thereon, a latch piece supported on the slide member in such a way that the latch piece is slidable in directions substantially perpendicular to the plane containing the slide member and between a first position where the latch piece is in engagement with either one of the interlocking means and a second position where the latch piece is out of engagement with any of the interlocking means, biasing means normally urging the latch piece toward the first position, and release means adapted to shift the latch piece to the second position so as to permit the adjustment of position of the anchor.

The adjustable anchor mounting device according to this invention has, owing to its structure, such an effect that it can hold its mounted position without failure even when the vehicle is overturned or a high load is applied thereto.

The above and other objects, features and advantages of the present invention will become more apparent from the following description and the appended claims, taken in conjunction with the accompanying drawings.

BEST MODE FOR CARRYING OUT THE INVENTION

Figure 1:
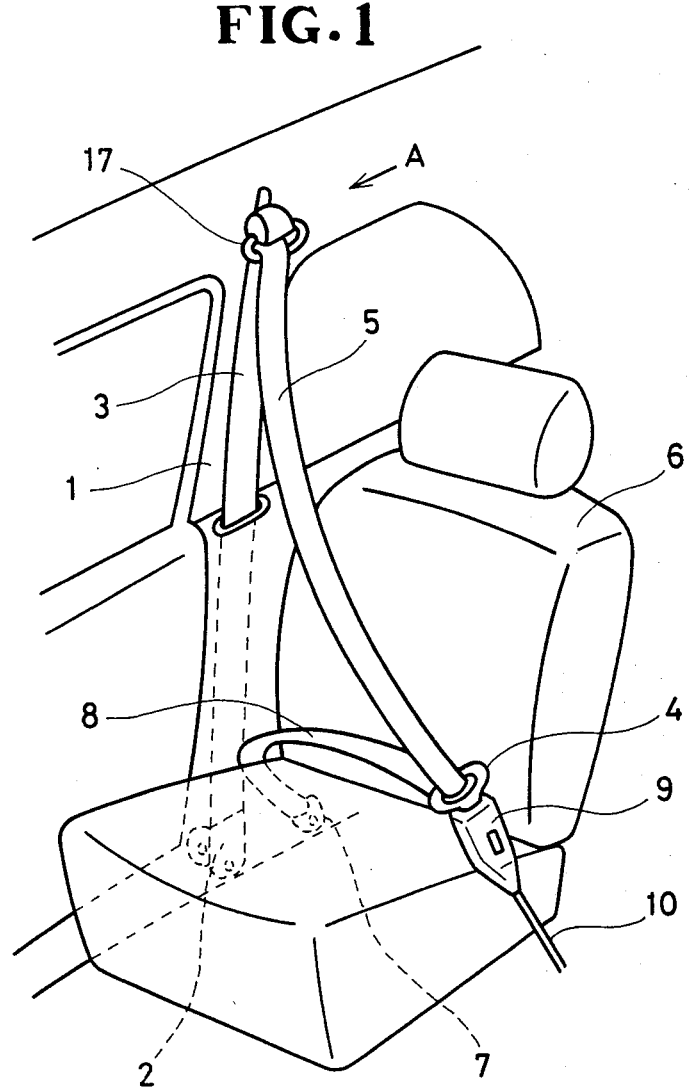
FIG. 1 is a schematic illustration of a vehicle seat belt in which the present invention has been incorporated.
Figure 2:
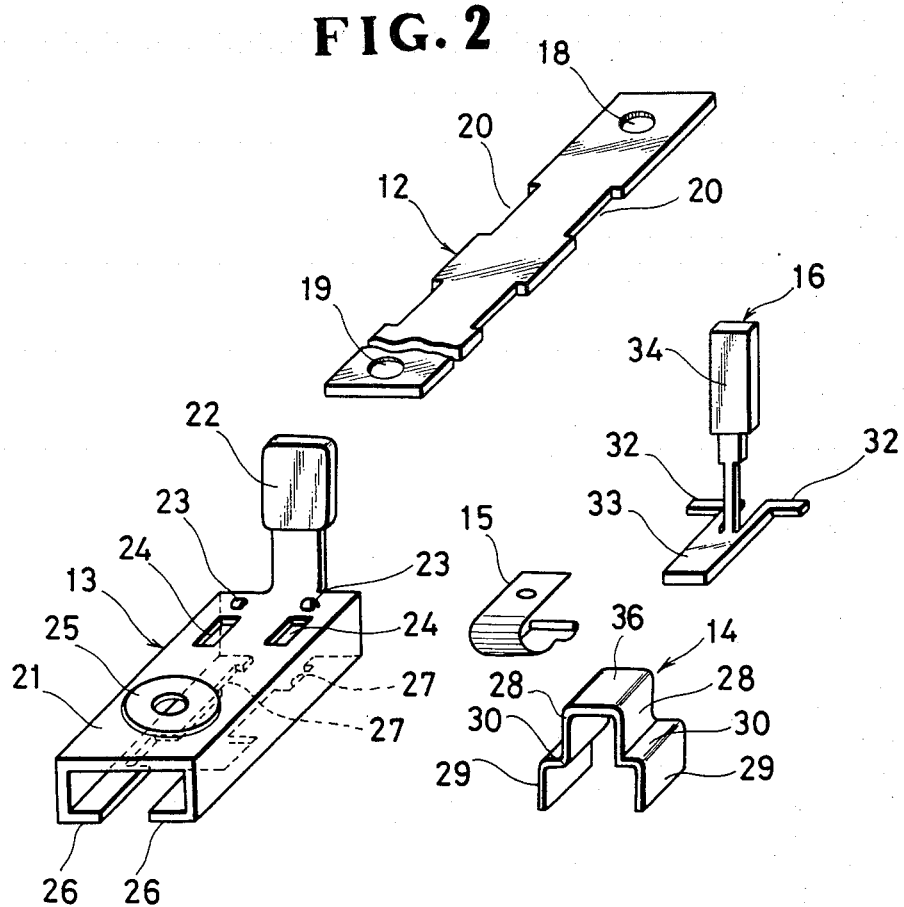
FIG. 2 is a perspective and exploded view of an adjustable anchor mounting device according to one embodiment of this invention.

In FIG. 1, an adjustable anchor, i.e., deflector mounting device according to one embodiment of this invention is fixedly secured on a center pillar 1. A lap-shoulder continuous webbing 3, which is received at one end portion thereof in a retractor 2 fixed in a lower portion of the center pillar 1, consists of a shoulder webbing 5 passing through and deflected by a deflector 17 and extending to a tongue 4 and a lap webbing 8 extending backward from the tongue 4 and sewed at the other end thereof on an anchor plate 7 attached fixedly at the outer side of a seat 6. At the inner side of the seat 6, a buckle 9 which is detachably coupled with the tongue 4 is provided via a flexible support 10.

The adjustable deflector mounting device according to this invention supports the deflector 17, which is usable for such a seat belt as mentioned above, while allowing adjustment of the height of the deflector 17. The adjustable deflector mounting device is principally constructed of a base 12 which is to be fixedly mounted on the center pillar 1, a slide member 13 slidable up and down while being guided by the base 12, a latch piece 14 supported slidably on the slide member 13, a latch spring 15 urging the latch piece 14, and a release lever 16 operably supported on the slide member 13 and serving as release means adapted to release the latch piece 14.

The base 12 defines attachment holes 18,19 through its upper and lower end portions and fixedly mounted on an upper portion of the center pillar 1 by means of bolts (not shown). Between the attachment holes 18,19, a plurality of indentations 20 are formed as interlocking means.

Surrounding the base 12, the slide member 13 is attached. The slide member 13 is formed into a lip-groove shape. On or through a front wall 21 of the slide member 13, there are provided, proceeding in order from the top thereof, an auxiliary lever 22 serving as auxiliary means upon operating the release lever 16, holders 23,23 swingably supporting the release lever 16, attachment slots 24,24 for providing the latch piece 14 with the slide member 13 and a seat 25 for mounting the deflector 17 thereon. In rear walls 26,26 of the slide member 13, guide portions 27,27 are respectively formed to guide the latch piece 14.

Figure 3:
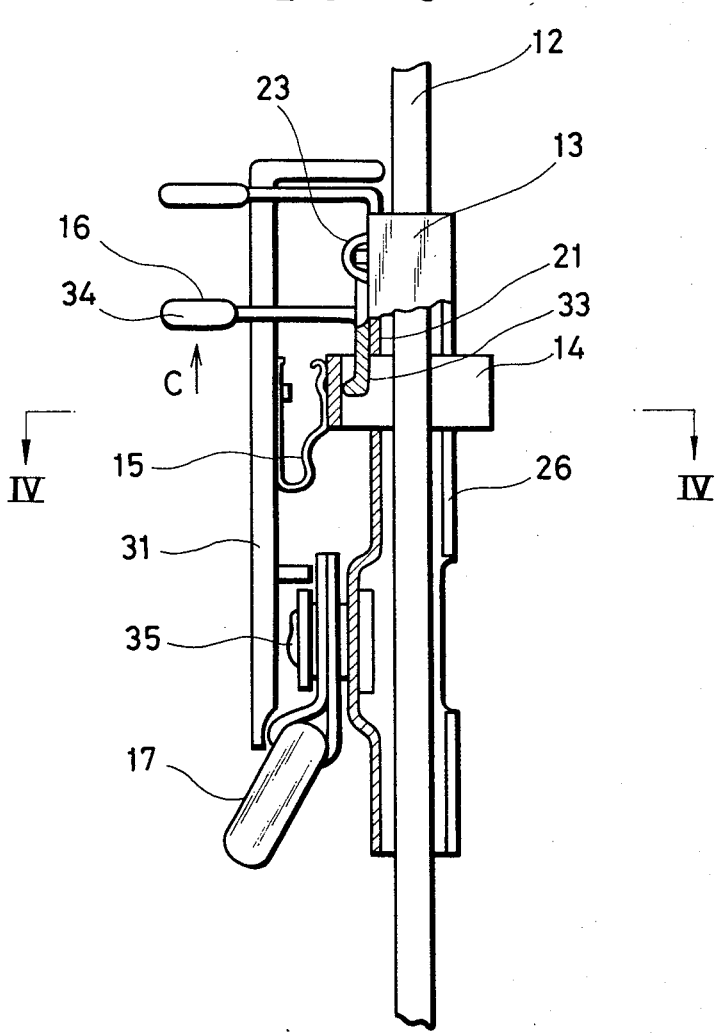
FIG. 3 is a side elevation of the adjustable anchor mounting device of FIG. 2, seen from the direction A of FIG. 1.
Figure 4:
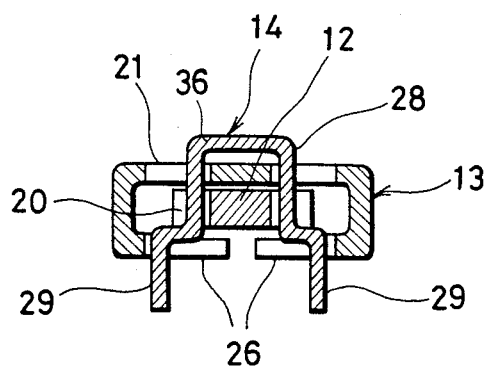
FIG. 4 is a cross-sectional view taken along line IV—IV of FIG. 3.

The latch piece 14 has a top portion 36 which lies over the front wall 21 of the slide member 13, a pair of neck portions 28,28 loose-fit in their corresponding attachment slots 24,24 formed through the front wall 21 of the slide member 13, leg portions 29,29 received respectively in either one pair of the guide portions 27,27 formed in the rear walls 26, 26 of the slide member 13, and a pair of shoulder portions 30,30 connecting the neck portions 28,28 respectively to the leg portions 29,29. As apparent from FIG. 4, the neck portions 28,28 of the latch piece 14 are brought into engagement with each pair of the indentations 20,20 formed in the base 12. The latch piece 14 is normally urged in the right-hand direction as seen in FIG. 3 by means of a latch spring 15 provided with a cover 31 (see, FIG. 3).

The release lever 16 has arms 32,32 which are swingably fit in their corresponding holders 23,23, a lifting portion 33 which is kept in contact with the top portion 36 of the latch piece 14, and a handle 34 which is operated by fingers or the like. The release lever 16 is normally applied with a biasing force, owing to the provision of the latch spring 15 the force of which is transmitted via the latch piece 14, so that the lifting portion 33 is normally urged in the counterclockwise direction, as seen in FIG. 3, against the front wall 21 of the slide member 13. It is preferable that, in the release lever 16, the distance from the fulcrum to a point on the handle 34 at which point the release lever 16 is operated is longer than the distance from the fulcrum to a point on the lifting portion 33 at which point the release lever 16 is kept in contact with the top portion 36 of the latch piece 14.

Furthermore, the deflector 17 is attached by a pin 35 on the seat 25 formed at a lower portion of the slide member 13 in such a way that the deflector 17 is turnable about the pin 35.

Next, description will be made on the operation of the adjustable deflector mounting device according to this invention. An occupant sits in the seat and, as illustrated in FIG. 1, inserts the tongue 4 into the buckle 9. If the shoulder webbing 5 extends over the right shoulder of the occupant when he has worn the lap-shoulder continuous webbing 3, the webbing is in a good restraining position and there is hence no necessity to adjust the height of the deflector 17.

It is however necessary to adjust the deflector 17 downwardly if the shoulder webbing 5 passes over the face or neck area of the occupant. If the shoulder webbing 5 passes over the right arm of the occupant in contrast to the above situation, it is necessary to adjust the deflector 17 upwards. When such an adjustment is required, it is necessary to push the handle 34 of the release lever 16 from its position shown in FIG. 3 upwardly in the direction indicated by the arrow C in the same figure. This causes the release lever 16 to turn in the clockwise direction against the urging force of the latch spring 15, thereby causing the latch piece 14, which is kept in contact with the lifting portion 33 of the release lever 16, to slide leftwards. Hence, the latch piece 14 is brought into a position where it is out of engagement with the base 12.

Figure 5:
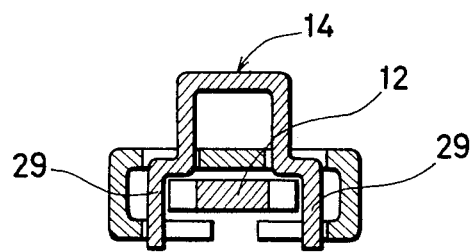
FIG. 5 is a cross-sectional view similar to FIG. 4 but the latch piece is out of engagement with the base.

The above-mentioned state is illustrated as a cross-sectional view in FIG. 5. Then, the slide member 13 is displaced or shifted upwardly or downwardly while maintaining the latch piece 14 in the above position. The upward pressing force which has been applied to the handle 34 is removed when the shoulder webbing 5 has come right over the right shoulder of the occupant. This permits the latch piece 14 to slide in such a direction that the latch piece 14 is to be inserted into the slide member 13. Thus, the latch piece 14 is finally brought into engagement with nearby indentations 20,20. The above operation permits a prompt, smooth, one-touch adjustment of the deflector 17, because the occupant is required only to shift the slide member 13 while pressing the handle 34 of the release lever 16 upwardly. Since the latch piece 14 is slid in a direction substantially perpendicular to the longitudinal plane of the slide member 13, the latch piece 14 can be smoothly brought into or out of engagement with the indentations 20,20 of the slide member 13.

In the event of an emergency, an emergency locking mechanism or system (not illustrated) built in the retractor 2 is actuated and any further release of the continuous webbing 3 is prohibited in the manner known per se in the art. Here, a great tensile force is applied to the continuous webbing 3 in order to restrain the occupant who would otherwise be forced to move by an inertia force. Thus, a load is applied through the deflector 17 to the deflector mounting device on which the continuous webbing 3 is supported by means of the deflector 17. In the above embodiment, the latch piece 14 is supported by two points with each corresponding indentation 20 interposed between the two points. In other words, the latch piece 14 is supported by both attachment slots 24,24 formed through the front wall 21 of the slide member 13 and both guide portions 27,27 formed respectively through the rear walls 26,26 of the slide member 13. Therefore, the latch piece 14 is supported on the slide member 13 in such a way that, in the event of an emergency, only a shear force is exerted. Since the shear force is borne at two faces (i.e., the face between the front wall 21 of the slide member 13 and the base 12; and the face between the base 12 and the rear walls 26,26 of the slide member 13), the mounted position of the deflector 17 can be maintained without failure even if a high load is applied to the deflector mounting device.

Furthermore, the latch piece 14 extends through desired indentations 20,20 of the slide member 12. Thus, the latch piece 14 will not be disengaged from the desired indentations 20,20 even if, for example, the vehicle is overturned and the deflector 17 is pulled strongly in the upward direction as seen in FIG. 3.

The above embodiment has been given by way of example only and not by way of limitation of the invention. Various changes and modifications can thus be made thereto. For example, through-holes may be formed in place of the indentations as interlocking means of the slide member. The latch piece may be formed into a pin-like configuration. An operation member having a tapered surface which engages with the latch piece may be used as release means for the latch piece so that the latch piece may be operated by displacing the operation member in directions perpendicular to the sliding directions of the latch piece.

In the above embodiment, the description has been made on a seat belt in which the shoulder webbing is supported at an intermediate part thereof by causing the shoulder webbing to extend at the intermediate part thereof through the deflector. Needless to say, an anchor mounting device similar to the above embodiment may be equally applied to fixedly secure the upper end of a lap-shoulder continuous webbing or a shoulder webbing, or to fixedly hold a buckle or the lower end of a lap-shoulder continuous webbing or a lap webbing.

Furthermore, the latch piece may be supported on the slide member in such a way that the latch piece is slidable in directions somewhat deviated from those perpendicular to the plane containing the slide member, so long as the slide member is adjustable with ease.

What is claimed is:

1. An adjustable anchor mounting device comprising:
   a substantially planar base to be mounted fixedly on a vehicle body and having a plurality of interlocking means provided in pairs spacedly along the direction of displacement of an anchor;
   a slide member guided along the base, carrying the anchor thereon, having substantially a lip-groove shape and including a front wall, a pair of side walls extending rearward from the front wall and a pair of rear walls extending inwardly from the respective side walls, whereby surrounding the base;
   a latch piece supported on the slide member in such a way that the latch piece is slidable between a first position where the latch piece is in engagement with either one of the interlocking means and a second position where the latch piece is out of engagement with any of the interlocking means, said latch piece being formed of a plate-like member, being engageable with either one of the interlocking means, having a pair of leg portions received respectively in attachment slots formed through the front wall and guide portions formed in the rear walls and a top portion connecting the leg portions together, and being formed substantially into a U-shape as seen in a transverse cross-section thereof;
   biasing means normally urging the latch piece toward the first position; and
   release means engageable with the top portion of the latch piece and permitting the shifting of the latch piece to the second position when moved relative to the latch piece.

2. The adjustable anchor mounting device according to claim 1, wherein said interlocking means are provided in pairs along both longitudinal sides of the base and the leg portions of the latch piece engage either pair of the paired interlocking means.

3. The adjustable anchor mounting device according to claim 1, wherein the release means is a lever having a first portion where the release means is engaged with the latch piece and a second portion where the release means is operated by fingers and is swingably supported on the slide member.

4. The adjustable anchor mounting device according to claim 3, wherein, in the lever, the distance from the fulcrum to the second portion is longer than the distance from the fulcrum to the first portion.

5. The adjustable anchor mounting device according to claim 1, wherein the anchor is a deflector.

6. An adjustable anchor mounting device comprising:
   a substantially planar base to be mounted fixedly on a vehicle body and having a plurality of interlocking means provided in pairs spacedly along the direction of displacement of an anchor;
   a slide member guided along the base, carrying the anchor thereon, having substantially a lip-groove shape and including a front wall, a pair of side walls extending rearward from the front wall and a pair of rear walls extending inwardly from the respective side walls, whereby surrounding the base;
   a latch piece supported on the slide member in such a way that the latch piece is displaceable between a first position where the latch piece is in engagement with either one of the interlocking means and a second position where the latch piece is out of engagement with any of the interlocking means and is slidable in a direction extending through the base, said latch piece being formed of a plate-like member and having a pair of legs spaced from each other with an interval broader than the width of the base and received respectively in guide portions defined in the rear walls of the slide member, a pair of neck portions provided engageably with either one of the interlocking means and received respectively in attachment slits formed through the front wall of the slide member, a pair of shoulder portions connecting respectively the legs to the corresponding neck portions, and a top portion connecting the neck portions together;
   biasing means normally urging the latch piece toward the first position; and
   release means engageable with the top portion of the latch piece and permitting the shifting of the latch piece to the second position when moved relative to the latch piece.

7. The adjustable anchor mounting device according to claim 6, wherein said interlocking means are provided in pairs along both longitudinal sides of the base and the neck portions of the latch piece engage with either pair of the paired interlocking means.

8. An adjustable anchor mounting device comprising:
   a base to be mounted fixedly on a vehicle body and having a plurality of interlocking means provided in pairs spacedly along the direction of displacement of an anchor;
   a slide member guided along the base, carrying the anchor thereon, having substantially a lip-groove shape and including a front wall, a pair of side walls extending rearward from the front wall and a pair of rear walls extending inwardly from the respective side walls, whereby surrounding the base;
   a latch piece supported on the slide member in such a way that the latch piece is slidable between a first position where the latch piece is in engagement with either one of the interlocking means and a second position where the latch piece is out of engagement with any of the interlocking means, said latch piece comprising a plate-like member, being engageable with either one of the interlocking means, having a pair of leg portions received respectively in attachment slots formed through the front wall and guide portions formed in the rear walls and a top portion connecting the leg portions together, and being formed substantially into a U-shape as seen in a transverse cross-section thereof;

biasing means normally urging the latch piece toward the first position; and release means formed substantially into a T-like configuration with a lifting portion engageable with the top portion of the latch piece, said release means attached pivotally on the slide member and having a manually operable handle connected thereto.

9. The adjustable anchor mounting device according to claim 8, wherein the distance from the fulcrum of the release means to the manipulated point thereof is longer than the distance from the fulcrum to a point where the release means is brought into engagement with the top portion of the latch piece.

* * * * *